United States Patent Office 3,354,130
Patented Nov. 21, 1967

3,354,130
PROCESS FOR THE PRODUCTION OF
THERMOSETTING RESINS
Karl-Heinz Hornung and Erwin Heinrich, Marl, Germany, assignors to Chemische Werke Huls Aktiengesellschaft, Marl, Germany
No Drawing. Filed July 29, 1964, Ser. No. 386,048
Claims priority, application Germany, Aug. 28, 1963,
C 30,788
24 Claims. (Cl. 260—79.5)

The present invention relates to the production of heat-hardenable synthetic resins from polymers containing epoxide groups. More particularly, it relates to the production of heat-hardenable synthetic resins having good elasticity by treating polymers containing epoxide groups with mercaptoacetic acid.

Thermosetting resins have previously been produced by reacting polymers containing epoxide groups with mercaptocarboxylic acids in a manner such that two mols of the mercaptocarboxylic acid combined by addition or esterification with each epoxide group of the polymer. Such resins, however, although having good thermosetting properties, were subject to certain defects which materially reduced their commercial utility. Such resins, after ageing and additional hardening lost much of their elasticity, making them unsuitable for many purposes.

It has now been discovered that in accordance with the present invention the previous defects in such thermosetting resins can be eliminated and resins obtained which retain good elasticity after ageing and additional hardening. This desired result is attained by regulating the reaction so that specific limited ratios of the reactants enter into the reaction. In order to obtain thermosetting resins by the addition reaction of mercaptoacetic acid and polymers containing epoxide groups which have good elasticity properties after ageing and additional hardening the polymer should contain an epoxide-oxygen content of 0.1 to 15% and it should be reacted with 0.1 to 30 molar percent of a mercaptoacetic acid per mol of epoxide.

While products of satisfactory properties can be obtained from polymers containing from 0.1 to 15% epoxide-oxygen, preferred results are obtained by the use of polymers containing from 0.1 to 8% epoxide-oxygen.

Examples of polymers of the above character suitable for use according to the present invention include: partially epoxidized cis- or trans-polybutadienes, epoxidized copolymers of butadiene and styrene, epoxidized copolymers of butadiene and methyl methacrylate, epoxidized terpolymers of sytrene butadiene and butyl acrylate or epoxidized terpolymers of styrene, butyl acrylate, glycidyl acrylate. Polymers of these kinds can be produced by ploymerization of unsaturated monomers containing epoxide groups, as for example, glycidyl acrylate or glycidyl methacrylate, or by the mixed polymerization of such compounds with unsaturated monomers, such as for example, butadiene, styrene, acrylic esters, and methacrylic esters, or by epoxidizing unsaturated polymers of dienes and olefins such as styrene and acrylic acid esters.

The mercaptoacetic acid should be used in an amount ranging from 0.1 to 30 molar percent, and preferably from 0.1 to 10 molar percent, per 1 mol of the epoxide-group-containing polymer selected.

The reaction of the mercaptoacetic acid with the epoxide-group-containing polymers which contain, in addition, unepoxidized double bonds can be effected at temperatures between 80 and 140° C., and preferably between 100 and 120° C., solvents such as for example benzene, toluene, and xylene being used, if desired.

The resins can be cross-linked by simple heating or by means of unsaturated polyesters, or by polymers containing the acrylic acid double bond, or by bis-acryloamido- or bis-acrylic-acid derivatives with the addition of activators such as tertiary amines or sodium methylate.

The following specific examples are given for the purpose of illustrating the present invention but it is distinctly understood that variations therefrom will be obvious to one skilled in the art, and that such variations which do not depart from the concept of the invention are intended to come within the scope of the appended claims.

Example I 2 grams of mercaptoacetic acid diluted with xylene were added drop-by-drop over a period of five hours to 250 grams of a 20% solution of an epoxidized terpolymer of styrene-butadiene-butyl acrylate having a 5% epoxide-oxygen content, and maintained at a temperature of 120° C. The resulting resin retained good elasticity properties after ageing and additional hardening.

Example II 200 grams of epoxidized butadiene-styrene copolymer (50:50) with an epoxide-oxygen content of 1.7% were reacted in the form of a 20% solution in xylene by the dropwise addition of 6 grams of mercaptoacetic acid diluted with xylene. After 4 hours 5 grams of mercaptoacetic acid were added. The resulting resin possessed good thermosetting properties and after ageing and additional hardening retained good elasticity properties.

Example III 200 grams of a terpolymer of butadiene-styrene-butyl acrylate (30:50:20) with an epoxide-oxygen content of 3.4% were reacted in the form of a 30% solution in xylene at 80° C. by the dropwise addition of 5 grams of mercaptoacetic acid diluted with xylene. After 4 hours 3.8% of mercaptoacetic acid, based on the terpolymer, had been added. The solution thus obtained was further diluted with xylene until the solid content was 2%. The film properties of the heat-hardened polymer solution for a film 40μ thick are given in the following table.

TABLE

| Temp., ° C. | Time, Min. | Impact Hardness, Seconds | Erichsen Depression, mm. | After Ageing 2½ Days at 90° C. | |
|---|---|---|---|---|---|
| | | | | Impact Hardness, Seconds | Erichsen Depression, mm. |
| 100 | 50 | 116 | 9 | 170 | 6 |
| 100 | 30 | 72 | 10 | 165 | 8 |

In spite of the additional hardening after the ageing, the good elasticity of the film was retained.

What is claimed is:

1. In a process for the production of heat-hardenable resins by the condensation of epoxide-containing polymers with mercaptocarboxylic acids, the step which comprises reacting an epoxide-containing polymer having an epoxide-oxygen content ranging from 0.1 to 15%, with from 0.1 to 30 molar percent of a mercaptoacetic acid per mol of epoxide.

2. In a process for the production of heat-hardenable resins by the condensation of epoxide-containing polymers with mercaptocarboxylic acids, the step which comprises reacting an epoxide-containing polymer having an epoxide-oxygen content of from 0.1 to 8% with from 0.1 to 30 molar percent of a mercaptoacetic acid per mol of epoxide.

3. In a process for the production of heat-hardenable resins by the condensation of epoxide-containing polymers with mercaptocarboxylic acids, the step which comprises reacting at temperatures of 80 to 140° C. an epoxide-containing polymer having an epoxide-oxygen content ranging from 0.1 to 15%, with from 0.1 to 30 molar percent of a mercaptoacetic acid per mol of epoxide.

4. The process of claim 3 wherein the mercaptoacetic acid is added slowly to the epoxide-containing polymer.

5. The process of claim 1, wherein the polymer is a partially epoxidized cis-polybutadiene.

6. The process of claim 1, wherein the polymer is a partially epoxidized trans-polybutadiene.

7. The process of claim 1, wherein the polymer is an epoxidized copolymer of butadiene and styrene.

8. The process of claim 1, wherein the polymer is an epoxidized copolymer of butadiene and methyl methacrylate.

9. The process of claim 1, wherein the polymer is an epoxidized terpolymer of styrene, butadiene, and butyl acrylate.

10. The process of claim 1, wherein the polymer is an epoxidized terpolymer of styrene, butyl acrylate and glycidyl acrylate.

11. Heat-hardenable synthetic resins produced in accordance with the process of claim 1.

12. Heat-hardenable synthetic resins produced in accordance with the process of claim 5.

13. Heat-hardenable synthetic resins produced in accordance with the process of claim 6.

14. Heat-hardenable synthetic resins produced in accordance with the process of claim 7.

15. Heat-hardenable synthetic resins produced in accordance with the process of claim 8.

16. Heat-hardenable synthetic resins produced in accordance with the process of claim 9.

17. Heat-hardenable synthetic resins produced in accordance with the process of claim 10.

18. Heat-hardenable resins as defined by claim 11 wherein the epoxide oxygen content is 0.1–8%.

19. Heat-hardenable resins as defined by claim 12 wherein the epoxide oxygen content is 0.1–8%.

20. Heat-hardenable resins as defined by claim 13 wherein the epoxide oxygen content is 0.1–8%.

21. Heat-hardenable resins as defined by claim 14 wherein the epoxide oxygen content is 0.1–8%.

22. Heat-hardenable resins as defined by claim 15 wherein the epoxide oxygen content is 0.1–8%.

23. Heat-hardenable resins as defined by claim 16 wherein the epoxide oxygen content is 0.1–8%.

24. Heat-hardenable resins as defined by claim 17 wherein the epoxide oxygen content is 0.1–8%.

References Cited

UNITED STATES PATENTS 3,264,273　8/1966　Greenlee _____ 260—79.5
3,297,660　1/1967　Becker _____ 260—79.5

JOSEPH L. SCHOFER, *Primary Examiner.*

D. K. DENENBERG, *Assistant Examiner.*